US006430930B1

(12) United States Patent
Andersson

(10) Patent No.: US 6,430,930 B1
(45) Date of Patent: Aug. 13, 2002

(54) ARRANGEMENT FOR REDUCTION OF ACOUSTIC VIBRATIONS IN A COMBUSTION CHAMBER

(75) Inventor: Leif G. Andersson, Finspång (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/762,639

(22) PCT Filed: Jul. 23, 1999

(86) PCT No.: PCT/SE99/01308

§ 371 (c)(1),
(2), (4) Date: Mar. 23, 2001

(87) PCT Pub. No.: WO00/09945

PCT Pub. Date: Feb. 24, 2000

(30) Foreign Application Priority Data

Aug. 11, 1998 (SE) .............................................. 9802707

(51) Int. Cl.$^{7}$ .................................................. F02C 7/24
(52) U.S. Cl. ............................ 60/725; 60/746; 431/114
(58) Field of Search .......................... 60/725, 737, 746; 431/114

(56) References Cited

U.S. PATENT DOCUMENTS 5,373,695 A 12/1994 Aigner et al.
6,164,055 A * 12/2000 Lovett ....................... 60/39.06

FOREIGN PATENT DOCUMENTS

| | | |
|---|---|---|
| DE | 42 02 588 | 7/1993 |
| DE | 43 36 096 | 5/1994 |
| WO | WO 98/12478 | 3/1998 |

* cited by examiner

*Primary Examiner*—Ehud Gartenberg
(74) *Attorney, Agent, or Firm*—Burns, Doane, Swecker & Mathis, L.L.P.

(57) ABSTRACT

The invention refers to a combustion chamber device including a combustion chamber (2) and a set of burners (6) with an outlet opening (7) in the combustion chamber. Each burner includes members (10) for the supply of a flow of oxygen-containing gas, members (8) for the supply of fuel, and a space (9), which extends to the combustion chamber (2) for mixing of the fuel and the oxygen-containing gas. Each burner (6) is arranged to convey a substantially equally large flow of oxygen-containing gas through the burner to the combustion chamber. Each burner (6) is defined by at least one parameter including a characteristic length (a) of the space (9) along the longitudinal direction (x). At least the characteristic length (a) of at least one of the burners is selected in such a way that it deviates from the corresponding length (a) of another burner and in such a way that the influence of the oscillations which arise during operation of the combustion chamber device are reduced.

19 Claims, 3 Drawing Sheets

ARRANGEMENT FOR REDUCTION OF ACOUSTIC VIBRATIONS IN A COMBUSTION CHAMBER

THE BACKGROUND OF THE INVENTION AND PRIOR ART

The present invention refers to a combustion chamber device, including a combustion chamber and a set of burners which each has an outlet opening in the combustion chamber.

In such combustion chambers with several burners, for instance gas turbines, acoustic pressure oscillations, or pressure pulsations might arise, which lead to mechanical oscillations creating strength problems and noise problems. Such oscillations may have an oscillation frequency at some or several hundreds of Hz and is, in combustion chambers for gas turbines, an increasing problem, at least partly due to the more severe requirements of lower emissions of, for instance, $NO_x$ compounds. A possible explanation to the increase of the oscillations when the emissions decreases could be that a fuel of a main flow and the air are premixed and form a mixture in which the combustion thereafter will take place. The better and more uniform mixture, the lower is the percentage of emissions, but at the same time the burning volume is more susceptible for pressure oscillations. Since combustion chamber devices today frequently include a plurality of burners which influences each other via any common space, such as a combustion chamber, the oscillations from different burners will in many cases also intensify each other.

It is known that the influence of such acoustic pressure oscillations at least partly may be reduced by the supply of fuel in a so-called pilot flow, i.e. a fuel which is not pre-mixed. However, the combustion of such a pilot flow results in an increase of the emissions.

DE 4 336 096 discloses an annular combustion chamber with a plurality of burners. The burners are displaced in relation to each other in a longitudinal direction in order to reduce the oscillations. All the burners seem to have an identical shape.

WO 98/12479 discloses a combustion chamber for a gas turbine with a number of burners of different sizes. However, each burner has a maintained geometrical shape, i.e. all measure relations have been maintained although the size is changed.

SUMMARY OF THE INVENTION

The object of the present invention is to reduce the influence of the acoustic pressure oscillations which are generated during operation of a combustion chamber device without, at the same time, increasing the emissions of, in the first place, nitrogen oxides.

This object is obtained by the combustion chamber device initially defined, in which each burner includes members for the supply of a flow of an oxygen-containing gas to the burner, members for the supply of a fuel to the burner and a space, which extends to the combustion chamber along a longitudinal direction and is arranged to enable the mixture of the fuel supplied and the oxygen-containing gas supplied, wherein each burner is arranged to convey a substantially equally large flow of oxygen-containing gas through the burner to the combustion chamber, wherein each burner is defined by at least one parameter, which includes a characteristic length of the space along the longitudinal direction, and wherein at least the characteristic length of at least one of said burners is selected in such a way that it deviates from the corresponding length of another burner in said set, and in such a way that the influence of the oscillations which arise during operation of the combustion chamber device are reduced.

By changing the geometry of the burners in such a way and by giving the burners an asymmetric or irregular characteristic it is possible to obtain different frequencies of the oscillations which are generated at different burners, which substantially reduces the risk that the oscillations which are generated in different parts of the combustion chamber device will intensify each other. Instead, the probability that at least a part of the oscillations will interfere in such a way that they are reduced, or even attenuate each other, increases. Consequently, the invention creates the possibilities of determining, by calculations, such a value of the characteristic length for at least one of the burners that the influence of the oscillations which arise during operation of the combustion chamber device are substantially reduced. A change of the length of the space or the burner may be obtained in an easy manner. The combustion chamber construction is not influenced by such a change of one or several burners. By designing all of the burners in such a way that they are arranged to convey an essentially equally large flow or an equally large quantity of oxygen-containing gas through the burner to the combustion chamber, the oscillation reducing effect may be obtained in an easy manner since each burner may be controlled with respect to the fuel supply as if they were identical.

According to an embodiment of the invention, each burner extends between a rearward end portion, which includes said members for the supply of an oxygen-containing gas, and a forward end portion, which includes said outlet opening. Thereby, the whole space may be utilised for giving the flow of oxygen-containing gas the desired properties, as to obtain an effective mixture with the fuel. Thereby, said members for the supply of a fuel may be provided upstream the forward end portion and in particular at the rearward end portion. However, said members for the supply of fuel may also include a distribution member which is provided in the space downstream the rearward end portion. Advantageously, the space and the characteristic length extend from the rearward end portion to the outlet opening. It is also possible to let the space and the characteristic length extend from said members for the supply of a fuel to the outlet opening.

According to a further embodiment of the invention, said parameter includes a characteristic width of the space. The characteristic width may extend perpendicularly to said longitudinal direction of said space. Advantageously, the space has an elongated shape, i.e. the characteristic length is substantially greater than the characteristic width. Furthermore, the space may have an essentially circular cross-sectional shape transversally to the longitudinal direction and be substantially cylindrical.

According to a further embodiment of the invention, the characteristic width of at least one of said burners is selected in such a way that it deviates from the corresponding width of another burner in said set. By such a geometric variation, the possibilities are further increased to reduce the pressure pulsations in an effective manner.

According to a further embodiment of the invention, said parameter includes a distance from the burner in question to the closest adjacent burner and wherein said-distance from at least one of said burners to the most closely adjacent burner is selected in such a way that it deviates from a corresponding distance between two other adjacent burners in said set.

According to a further embodiment of the invention, said parameter for at least two of said burners is selected in such a way that it deviates from the corresponding parameter for another burner in said set. By varying the geometry of several burners, the possibilities are increased to reduce the oscillations or the pressure pulsations. Thereby, said parameter for a plurality of said burners may be selected in such a way that it deviates from the corresponding parameter for another plurality of said burners in said set. Of course, it is also possible to let any of said parameters be different for essentially every burner of a combustion chamber device according to the invention.

According to a further embodiment of the invention, the device is arranged to be provided upstream of a gas turbine and to supply hot combustion gas to the gas turbine. Such an application is advantageous since the problem of the oscillations is serious, especially in connection with gas turbines. Thereby, the combustion chamber may be annular or ring-shaped, and extend around an axis of rotation of a gas turbine along a substantially circular path.

According to a further embodiment of the invention, the burners of said set are provided along the substantially circular path, wherein said parameters also include a distance from said burners to the substantially circular path and wherein this distance of at least one of said burners is selected in such a way that it deviates from the corresponding distance of another burner in said set.

BRIEF DESCRIPTION OF THE DRAWINGS

The present invention is now to be explained more closely by means of different embodiments and with reference to the drawings attached.

DETAILED DESCRIPTION OF DIFFERENT EMBODIMENTS OF THE INVENTION

The present invention is now to be explained in connection with a gas turbine device 1 which includes an annular or ring-shaped combustion chamber 2, i.e. a combustion chamber 2 which extends along a substantially circular path o around a rotor 3 of the gas turbine device 1 and around the axis r of rotation about which the rotor 3 rotates. However, it is to be noted that the invention also is applicable to other types of combustion chamber devices than annular ones, and also may be utilised in other connections than for a gas turbine device.

Figure 1:
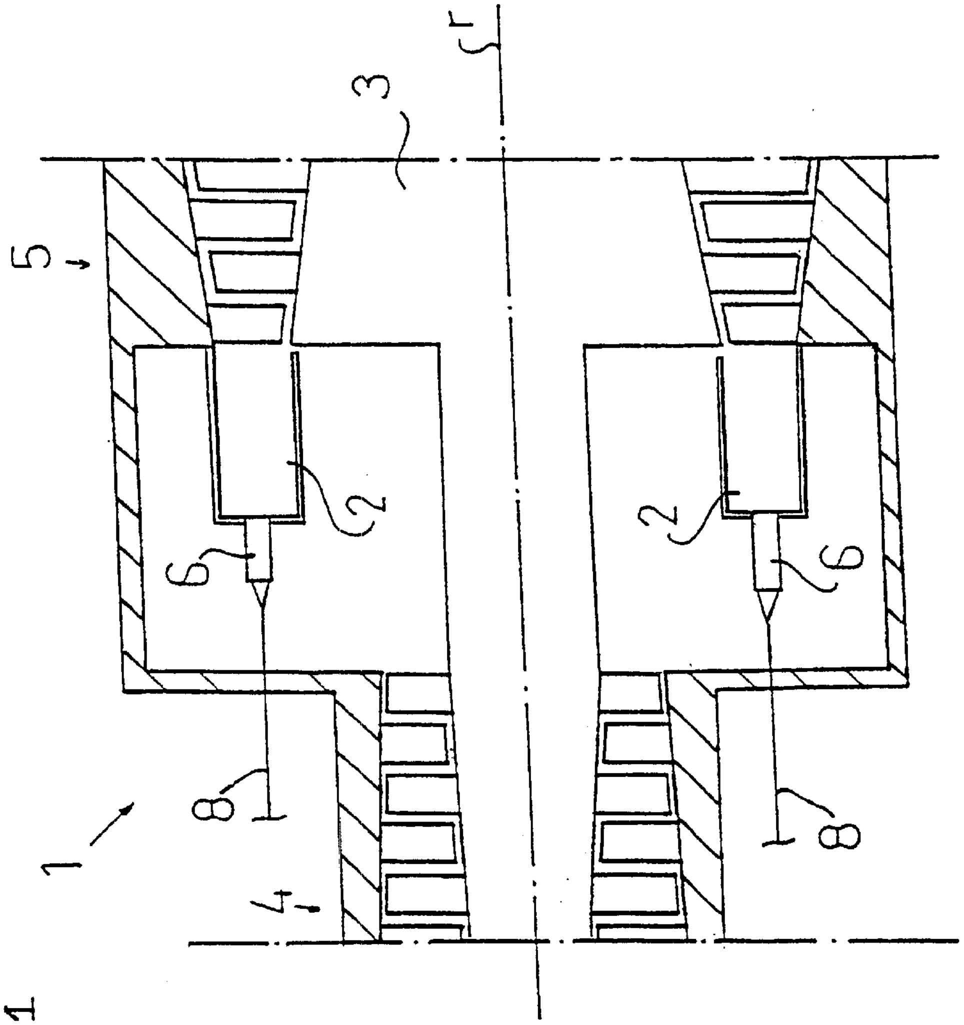
FIG. 1 discloses a longitudinal section through a combustion chamber device according to an embodiment of the invention.

The gas turbine device 1 disclosed in FIG. 1 includes a compressor 4 and a gas turbine 5. The combustion chamber device of the gas turbine device 1 includes the annular combustion chamber 2 mentioned above and a set of burners 6 which all have an outlet opening 7 which extends through a delimiting wall 2' of the common combustion chamber 2.

Each burner has a rearward end portion, and an intermediate space 9, and a forward end portion, which includes the outlet opening 7. Each burner 6 includes members in the form of a fuel supply conduit 8 and at least a nozzle (not disclosed more closely) for the supply of fuel, in the form of oil or gas, to the burner 6. In addition, each burner 6 includes members for the supply of combustion air or any other oxygen-containing gas to the burner 6 by means of the compressor 4. In the example disclosed, these members include elongated supply openings 10, see FIG. 3, in the rearward end portion of each burner 6. These supply openings 10 are designed in such a way that the combustion air supplied is given a movement of rotation in the burner 6. The supplied fuel and the supplied combustion air are mixed in the space 9. Preferably, the supply openings 10 are designed in such a way that the quantity of the combustion air supplied to the burner 6 is substantially identical for all the burners 6.

The space 9 extends along a longitudinal direction x from the rearward end portion, and more closely from the supply openings 10, to the forward end portion and has an elongated shape. In the embodiment disclosed in FIGS. 2 and 3, the space 9 has a substantially circular cross-sectional shape transversally to the longitudinal direction x. In the embodiment disclosed, the space 9 is substantially cylindrical. However, it is possible to let the burner 6 and the space 9 have an expanding or tapering shape, for instance a conical shape. It is to be noted here that the burner 6 and the space 9, within the scope of the invention, may be designed in may different ways, for instance, the supply openings 10 for combustion air may have many different shapes and be positioned in a plurality of different positions.

However, each burner 6 is related to or defined by a number of different parameters which are valid irrespective of the geometry of the burners 6 or the position of the burners 6 in relation to the combustion chamber 2 and other burners 6. These parameters include a characteristic length a of each burner 6. In the example disclosed, the characteristic length a is the length of the space 9 along the longitudinal direction x. Another such parameter is the distance b of the burner 6 in question to the most closely adjacent burner or burners 6. A further parameter is a characteristic width c of each burner 6. In the embodiment disclosed in FIGS. 2 and 3, this characteristic width c is the width of the space 9. Due to the elongated shape, in this example, of the space 9 the characteristic length a is thus substantially greater than the characteristic width c. However, it is possible within the scope of the invention to let the characteristic width be equal to or greater than the characteristic length a.

Figure 2:
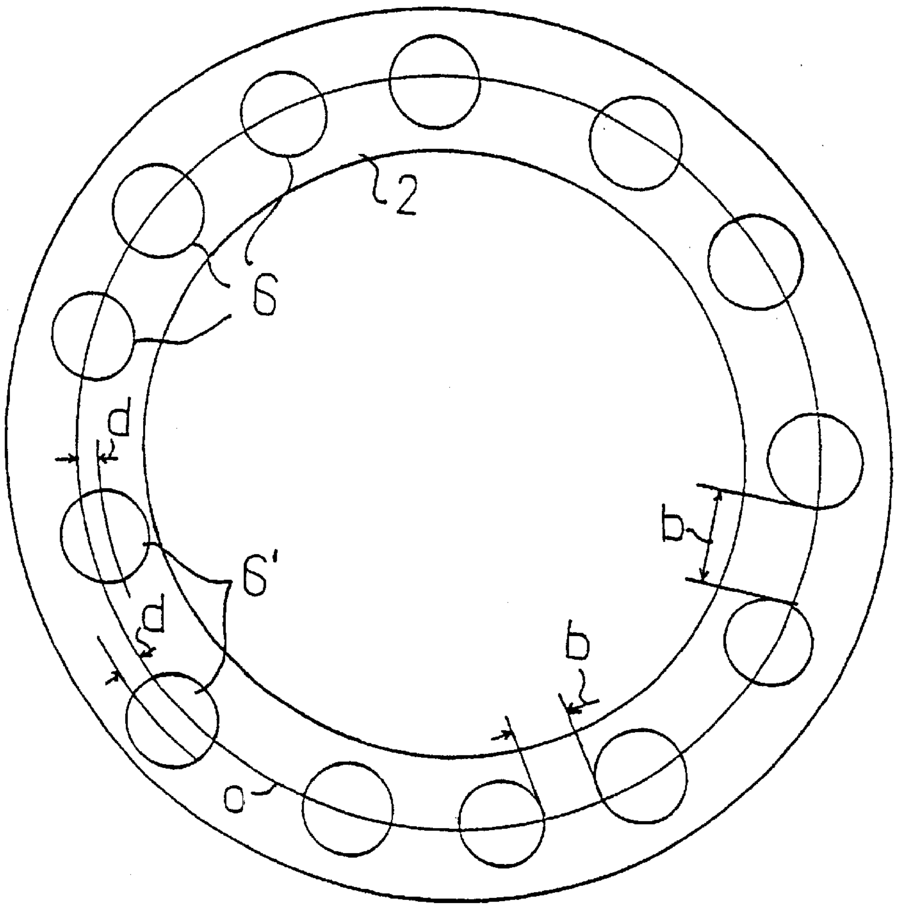
FIG. 2 discloses a cross-section through the combustion chamber device in FIG. 1.

In the embodiment disclosed in FIG. 2, the burners 6 are provided along the substantially circular path o mentioned above. A further parameter may be the deviation of the burner 6 from the circular path o, or more precisely, the shortest distance d between the circular path o and the longitudinal direction x. This parameter, which also reflects the position of the burner 6 in the combustion chamber 2, may at least in the example disclosed also be expressed as a distance to a common centre point in the combustion chamber 2.

Figure 4:
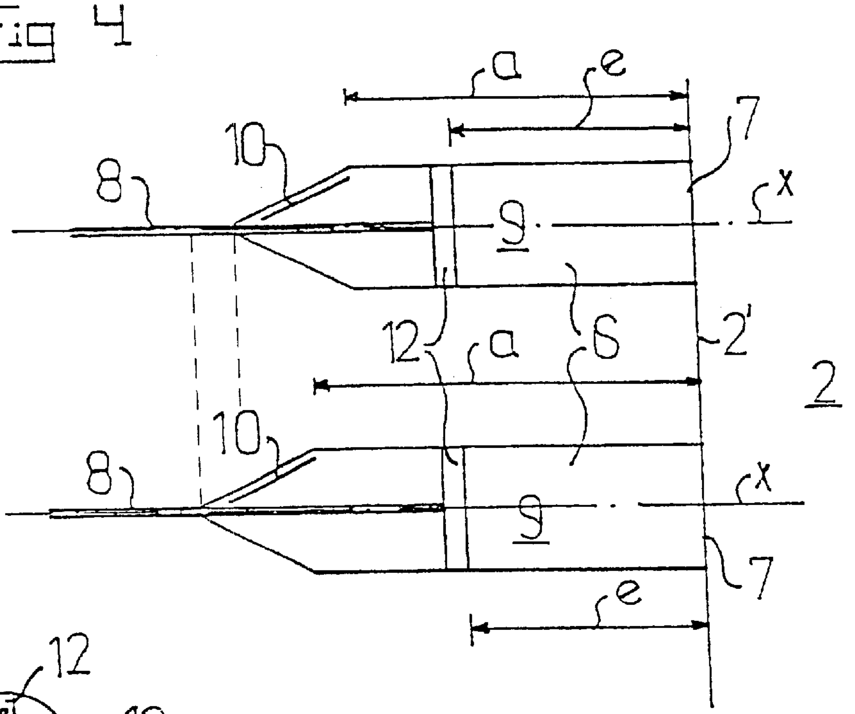
FIG. 4 discloses the design of different burners of the combustion chamber device according to a further embodiment of invention.
Figure 5:
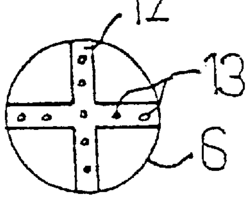
FIG. 5 discloses a front-view of a burner in FIG. 4.

FIGS. 4 and 5 disclose a set of burners 6 with a fuel supply member including the fuel supply conduit 8 and a distribution member 12, which is provided in the space 9 downstream the rearward end portion and downstream the supply openings 10. The distribution member 12 includes in the example disclosed a number of pipes which extend radially outwardly from a centre to which the fuel supply conduit 8 is connected. Said pipes form a spoke configuration and each pipe includes a number of nozzles 13 for the supply of fuel to the space 9. Also in the embodiment disclosed in FIGS. 4 and 5, the space 9 and the characteristic length a may be considered to extend along the longitudinal direction x from the rearward end portion, i.e. the supply openings 10, to the forward end portion. However, it is also possible to define that the space 9 and the characteristic length e extend from the distribution member 12 to the forward end portion.

Up to now, combustion chamber devices have been constructed in such a manner that the parameters a, b, c, d, e defined above are substantially identical for each burner 6. However, according to the present invention, one or several of the burners 6 ought to be provided in such a way that the characteristic length a, e, and possibly one or several of the parameters b, c, and d deviate from the corresponding parameter of the other burners 6. By one or several such deviations, it is possible to provide different oscillation frequencies in the different burners 6. In such a way, the acoustic pressure oscillations will not intensify each other but the probability increases that the oscillations instead attenuate each other, i.e. by such an asymmetric provision of the burner 6, the oscillations or the pressure pulsations may be substantially reduced.

Figure 3:
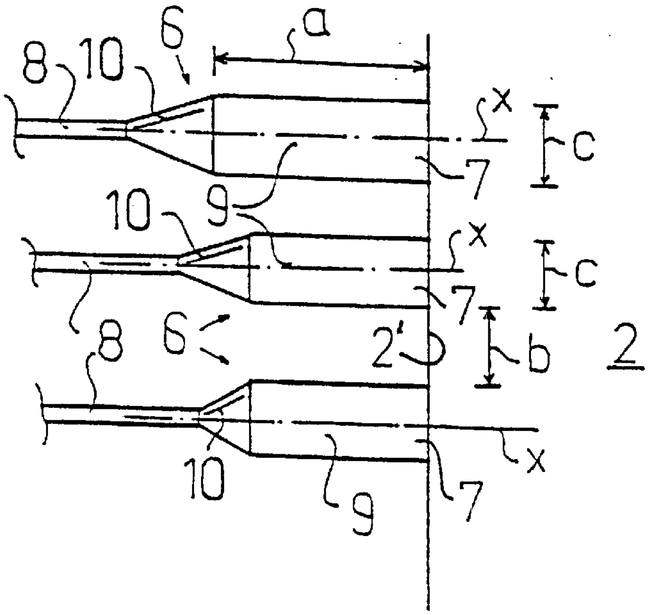
FIG. 3 discloses the design of different burners of the combustion chamber device in FIG. 1.

From FIG. 3 appears how the length a of the mixing space 9 may vary between different burners 6. Moreover, from FIG. 3 appears how the diameter, or the width c, of the mixing space 9 may vary between different burners 6. FIG. 2 illustrates clearly how the distance b between adjacent burners 6 may vary along the circular path o. From FIG. 2 also appears how two burners 6' may be displaced in relation to the circular path o.

According to the present invention, one burner 6 may deviate from all other burners with respect to any of the parameters defined above. It is also possible to let a number, for instance half of the burners 6 deviate with the same value with respect to any parameter in relation to the other burners 6. Furthermore, it is to be mentioned that each burner 6 may take a value for any one or some of said parameters, which differs from the value of a corresponding parameter of all other burners 6.

The present invention is not limited to the embodiments described but may be varied and modified within the scope of the following claims.

It is to be noted that the invention is applicable to all types of combustion chambers having more than one burner and also such devices in which each burner has its own combustion chamber but these influence each other via any common space, through which oscillations or pressure pulsation may propagate.

What is claimed is:

1. A combustion chamber device, including a combustion chamber and a set of burners which each has an outlet opening in the combustion chamber, wherein each burner includes members for the supply of a flow of an oxygen-containing gas to the burner, members for the supply of a fuel to the burner and a space, which extends to the combustion chamber along a longitudinal direction and is arranged to enable mixing of the supplied fuel and the supplied oxygen-containing gas, wherein each burner is arranged to convey a substantially equally great flow of oxygen-containing gas through the burner to the combustion chamber, wherein each burner is defined by at least one parameter which includes a characteristic length of the space along the longitudinal direction, and wherein the characteristic length of at least one of said burners is selected in such a way that it deviates from the corresponding length of another burner in said set and in such a way that the influence of the oscillations which arise during operation of the combustion chamber device are reduced.

2. A device according to claim 1, wherein each burner extends between a rearward end portion, which includes said members for the supply of an oxygen-containing gas, and a forward end portion, which includes said outlet opening.

3. A device according to claim 2, wherein said members for the supply of a fuel is provided upstream the forward end portion.

4. A device according to claim 3, wherein said members for the supply of a fuel is provided at the rearward end portion.

5. A device according to claim 3, wherein said members for the supply of a fuel include a distribution member which is provided in the space downstream the rearward end portion.

6. A device according to claim 2, wherein the space and the characteristic length extend from the rearward end portion to the outlet opening.

7. A device according to claim 1, wherein the space and the characteristic length extend from said members for the supply of a fuel to the outlet opening.

8. A device according to claim 1, wherein each of said parameters includes a characteristic width of the space.

9. A device according to claim 8, wherein the characteristic width extends perpendicularly to said longitudinal direction of said space.

10. A device according to claim 8, wherein the space has an elongated shape, i.e. the characteristic length is substantially greater than the characteristic width.

11. A device according to claim 8, wherein the characteristic width of at least one of said burners is selected in such a way that it deviates from the corresponding width of another burner in said set.

12. A device according to claim 1, wherein the space has a substantially circular cross-sectional shape transversally to the longitudinal direction.

13. A device according to claim 1, wherein the space is substantially cylindrical.

14. A device according to claim 1, wherein said parameters include a distance from the burner in question to the most adjacent burner and wherein said distance from at least one of said burners to the most adjacent burner is selected in such a way that it deviates from the corresponding distance between two other adjacent burners in said set.

15. A device according to claim 1, wherein said parameters for at least two of said burners is selected in such a way that it deviates from the corresponding parameter of another burner in said set.

16. A device according to claim 15, wherein said parameter for a plurality of said burners is selected in such a way that it deviates from the corresponding parameter for another parameter of said burner in said set.

17. A device according to claim 1, which is arranged to be provided upstream a gas turbine and to supply hot combustion gas to the gas turbine.

18. A device according to claim 17, wherein the combustion chamber is annular and extends around an axis of rotation of the gas turbine along a substantially circular path.

19. A device according to claim 18, wherein the burners of said set are provided along the substantially circular path, wherein said parameters in addition include a distance from said burners to the substantially circular path and wherein this distance of at least one of said burners is selected in such a way that it deviates from the corresponding distance of another burner in said set.

* * * * *